Dec. 25, 1928.  
J. O. BOVING  
1,696,792  
APPARATUS FOR RAISING LIQUIDS  
Filed Feb. 10, 1926  
3 Sheets-Sheet 1

Inventor  
Jens O. Boving  
by Cushman Bryant & Darby  
Attorneys

Dec. 25, 1928.
J. O. BOVING
1,696,792
APPARATUS FOR RAISING LIQUIDS
Filed Feb. 10, 1926  3 Sheets-Sheet 3
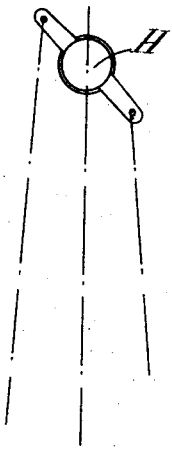
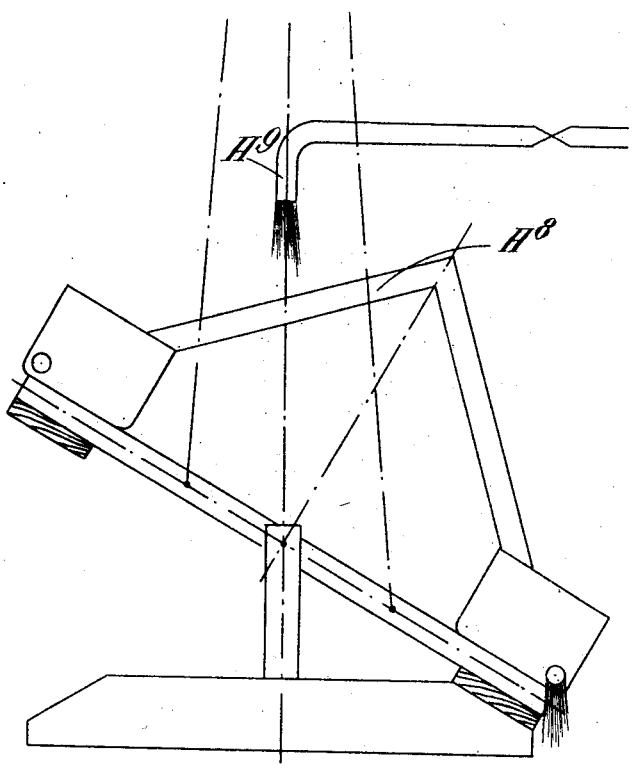
Fig. 4

Patented Dec. 25, 1928.

1,696,792

UNITED STATES PATENT OFFICE.

JENS ORTEN BOVING, OF WESTMINSTER, LONDON, ENGLAND.

APPARATUS FOR RAISING LIQUIDS.

Application filed February 10, 1926, Serial No. 87,370, and in Great Britain May 28, 1925.

This invention relates to apparatus for raising liquids by the head or difference in level between the high level portion and the low level portion of a body of liquid such as a river, these two portions being referred to as the high level liquid and the low level liquid respectively.

According to the invention the apparatus comprises a chamber (herein termed the vacuum chamber) arranged above the high level liquid, two downwardly extending conduits entering the said chamber and constituting with the latter a siphon serving by the descent of the liquid in one of the said conduits (which is herein termed the discharge conduit and dips into the low level liquid) to draw liquid up the other conduit (which is herein termed the supply conduit and dips into the high level liquid), an air induction device or head at the upper end of the discharge conduit serving, during the siphoning action, to cause air from the vacuum chamber to be entrained in the liquid entering the discharge conduit, and means for automatically causing a portion of the liquid to be discharged from the vacuum chamber to the atmosphere without breaking the continuity of the siphoning action. These means may comprise a closed tank (herein termed the intermediate tank) communicating by means of one or more non-return valves with the aforesaid vacuum chamber so that liquid can pass from this chamber to the tank but not from the tank to the chamber, a tank open to the atmosphere (which tank may constitute a reservoir in which the raised liquid is to be accumulated or which may communicate with the reservoir) and communicating with the intermediate tank by means of one or more non-return valves so that liquid can pass from the intermediate tank to the open tank but not from the latter tank to the intermediate tank, and an intermittently operated air valve or cock arranged in a pipe or conduit leading from the upper part of the intermediate tank to the upper part of the vacuum chamber, this valve in one position establishing communication between the air space of the intermediate tank and the vacuum space of the vacuum chamber and at the same time cutting off communication between the intermediate tank and the atmosphere, and in another position cutting off communication between the air space of the intermediate tank and the vacuum space of the vacuum chamber and at the same time opening the air space of the intermediate tank to the atmosphere. In this manner the liquid first flows from the vacuum chamber into the intermediate tank and thence flows into the open tank.

The discharge conduit may be in the form of a pipe arranged centrally within an outer pipe of larger diameter, the annular space between the two pipes constituting the supply conduit. The induction head is preferably made to float on the liquid within the aforesaid chamber and the upper part of the discharge pipe is made telescopic and connected to the induction head; in this manner the induction head and the contiguous part of the discharge pipe through which the liquid enters are maintained at a fixed position in relation to the level of the liquid in the chamber so as to obtain maximum efficiency.

The wall between the two conduits (i. e., the wall of the inner pipe when two coaxial pipes are provided) may be provided with charging ports which can be opened or closed at will in order to enable the siphoning action to be started without its being necessary to employ external means for creating a vacuum in the aforesaid vacuum chamber.

In order that the said invention may be clearly understood and readily carried into effect, the same will now be described more fully with reference to the accompanying drawings, in which:—

Figure 4 is a view shewing another device for operating the air valve.

Figure 1:
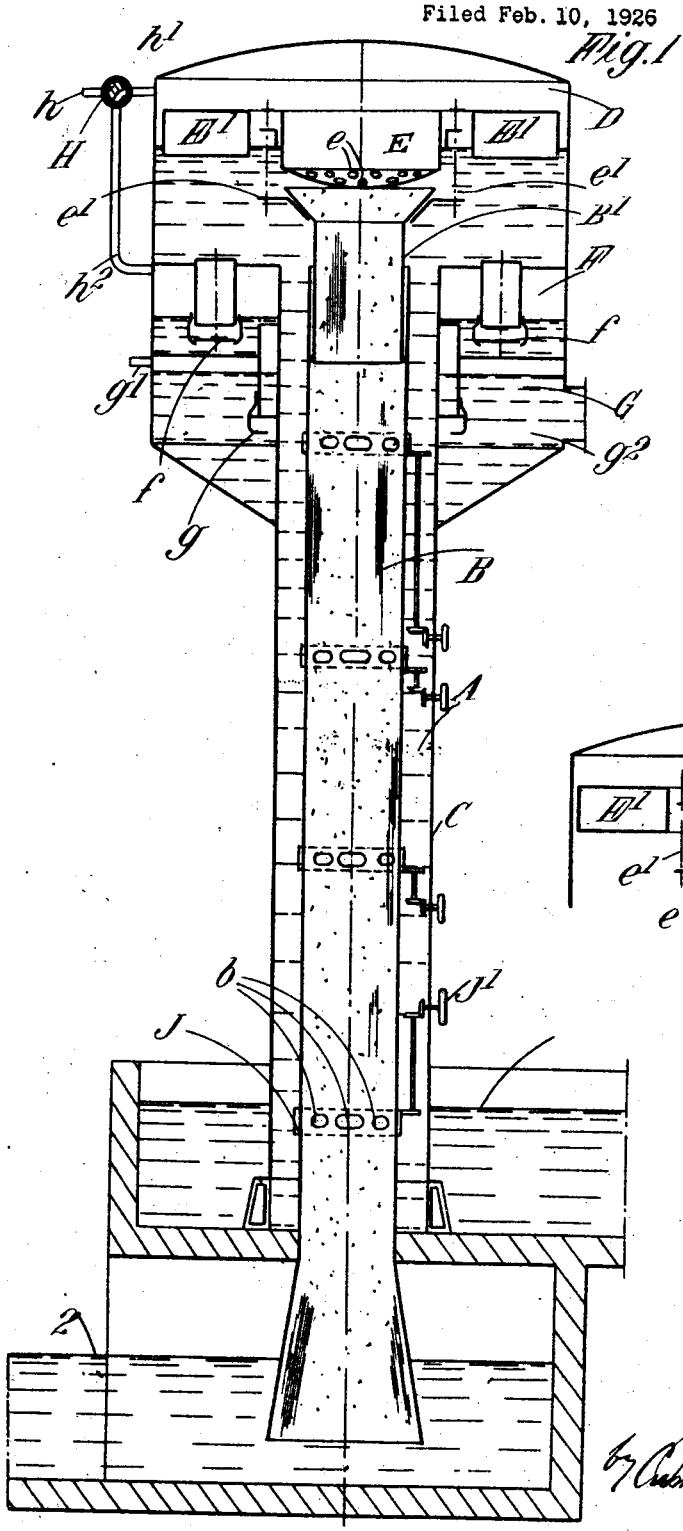
Figure 1 is a sectional view shewing a constructional form of the invention.

A is the supply conduit dipping into the high level water 1 and B is the discharge conduit dipping into the low level water 2 arranged at a suitable distance below the high level water. The latter conduit in the construction shewn is constituted by a pipe arranged centrally within another pipe C the annular space between the pipes constituting the supply conduit A. D is the vacuum chamber with which the conduits A and B communicate at their upper ends, and E is the induction head carried by a float $E^1$ and provided with air holes $e$, $e$—(or pipes) which communicate with the interior of the chamber D. The head E is connected to the upper part B¹ of the discharge conduit B, which upper part can slide with respect to the main part as shewn. By reason of this arrangement, the head E and the part B¹ always occupy the same position relatively to the level of the liquid in the chamber D notwithstanding any rise and fall of the level of this liquid which may occur during working. The connection between the head E and the part B¹ is preferably effected by adjustable screws $e^1$, $e^1$ so that the distance between the lower part of the head E and the flared opening at the top of the part B¹ can be altered to vary the amount of liquid flowing into the discharge conduit B.

F is the aforesaid intermediate tank which is arranged below the vacuum chamber D and communicates with the latter through downwardly opening non-return valves $f$, $f$, and G is the aforesaid open tank which is arranged below the intermediate tank F and communicates with the latter through a downwardly opening non-return valve $g$. The lower ends of the pipes with which the said non-return valves co-operate are provided with suitably spaced clips which retain the said valves in place when they move to the open position. The tank G has at its upper part a pipe $g^1$ communicating with the atmosphere and also has at its lower part a discharge opening $g^2$ through which the liquid discharges into a reservoir which is not shewn. H is the aforesaid air valve arranged in a casing having three pipes $h$, $h^1$ and $h^2$ of which $h$ communicates with the atmosphere, $h^1$ communicates with the upper part of the chamber D and $h^2$ communicates with the upper part of the intermediate tank F. The port in the valve H is so shaped that in one position the pipe $h$ is shut and the pipes $h^1$ and $h^2$ are in communication with each other as shewn in Figure 1 and in another position the pipe $h^1$ is shut and the pipe $h^2$ is in communication with the pipe $h$.

J is an adjustable sleeve which surrounds the discharge conduit B and which can be displaced by a handwheel J¹ on the outside of the pipe C so as to open or close at will charging ports $b$, $b$—in the wall of this conduit. In starting the working of the apparatus the valve H is moved to a neutral position in which there is no communication between the pipe $h^1$ and either of the pipes $h$ and $h^2$ and the sleeve J is moved to open the ports $b$, $b$—thereby establishing communication between the conduits A and B and therefore between the high level water 1 and the low level water 2. The water from the high level rushes through the ports $b$, $b$—into the lower part of the discharge conduit B and in so doing entrains a certain amount of air from the upper part of the conduit B and the chamber D thereby creating a small and steadily increasing vacuum. This causes the water level to rise in the conduits A and B and for an apparatus designed to give a moderate degree of vacuum in the chamber D the water level will eventually rise up to the desired height in the chamber D above the flared opening of the upper part B¹ of the conduit B, whereupon the sleeve J is moved to close the ports $b$, $b$—and the siphoning action is thus established, air being then sucked through the holes (or pies) $e$, $e$—of the induction head from the chamber D this air passing with the water down the discharge conduit B and escaping to the atmosphere at the low level. For an apparatus designed to give a greater degree of vacuum there may be two or more sets of the aforesaid ports at different levels as shown each provided with sleeves similar to the sleeve J and in this case the opening of the lower set of ports brings the water level up to the next highest set of ports; the latter set of ports are then opened and the lower set of ports closed, this action being repeated in respect of the other sets of ports (when these are provided) until the water level reaches the desired height in the chamber D as aforesaid. When the rarefication of the air in the vacuum chamber D has proceeded for a predetermined time (the water in the chamber having then risen considerably) the air valve H is caused to assume the position shewn in Figure 1 and the air pressures in the said chamber and in the intermediate tank F are thereby equalized. This results in water flowing from the chamber D to the tank F through the aforesaid non-return valves $f$, $f$ owing to the higher level of the water within the said chamber. After this operation has ceased (the siphoning action continuing meanwhile) the valve H is caused to assume the position in which the pipes $h$ and $h^2$ are placed in communication with each other (air communication between the tank F and the chamber D being thus cut off and the said tank being opened to the atmosphere) and as the water in this tank is at a higher level than the water in the open tank G there is then a flow of water from the tank F to the tank G through the non-return valve $g$ situated between these tanks. The above described sequence is then repeated and the operations continue so long as the siphoning action is allowed to take place.

Figure 2:
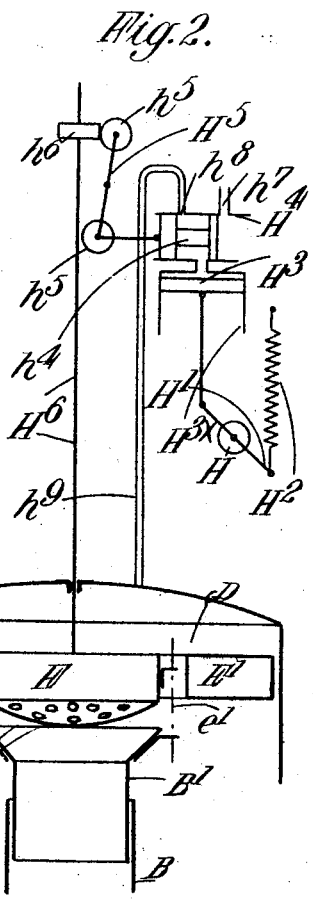
Figure 2 is a sectional view shewing one device for operating the aforesaid air valve.

In Figure 2 the air valve H is connected to a lever H¹ one end of which is operated on by a spring H² (or its equivalent) and the other end is connected to a piston H³ the lower surface of which is open to the atmosphere. The upper end of the cylinder H³ˣ in which the piston works communicates with a valve casing H⁴ containing a piston valve $h^4$ connected to a lever $H^5$ having two rollers $h^5$, $h^5$ with which co-operates a collar $h^6$ on a rod $H^6$ connected to the floating induction head E. The valve casing $H^4$ has a port $h^7$ communicating with the atmosphere and a port $h^8$ communicating by a pipe $h^9$ with the upper part of the chamber D. When the water rises in the chamber D the rod $H^6$ moves upward with the induction head E and eventually the collar $h^6$ on this rod operates upon the upper roller $h^5$ to move the valve $h^4$ into the position shewn in which the upper surface of the piston $H^3$ is subjected to the vacuum in the chamber D. Atmospheric pressure consequently moves the piston upwards and moves the air valve H into the position shewn in Figure 1 to enable water from the chamber D to flow into the intermediate tank F. The consequent fall in the level of the water in the chamber D causes the collar $h^6$ to co-operate with the lower roller $h^5$ and thereby move the valve $h^4$ to the right into a position in which the upper part of the cylinder $H^{3\times}$ is placed in communication with the atmosphere through the port $h^7$, the communication between the chamber D and the cylinder being cut off. The spring $H^2$ then reacts to move the air valve H into the other position hereinbefore described for causing water to again rise in the chamber D and water to flow from the tank F into the tank G. The air valve H is thus moved in agreement with the conditions prevailing in the chamber D.

Figure 3:
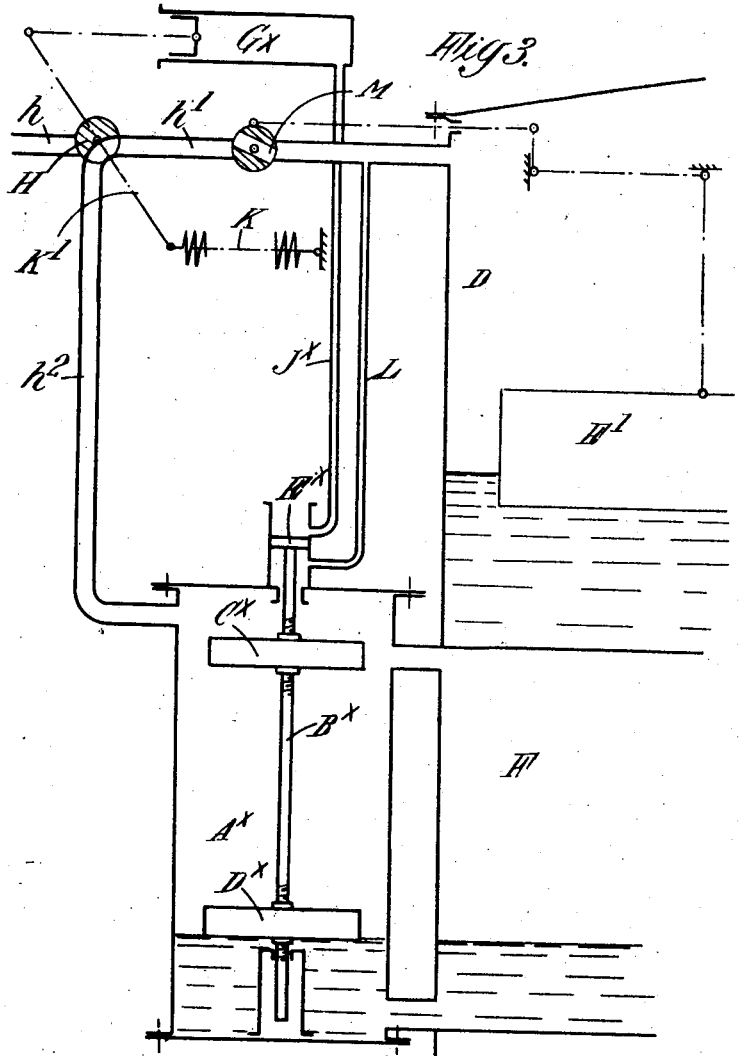
Figure 3 is a view shewing an alternative device for operating the air valve.

Referring to Figure 3, $A^\times$ is a float chamber communicating at top and bottom with the tank F. A sliding vertical spindle $B^\times$ carries adjustable floats $C^\times$ and $D^\times$ which are fixed at levels corresponding to the upper and lower limits of the water surface within the tank F at the beginning and end of the discharge of the liquid from this tank. At the upper end the spindle $B^\times$ carries a piston valve $E^\times$ which forms a relay controlling a servomotor $G^\times$. The air valve H of Figure 1 is controlled by this servomotor. The spindle $B^\times$ with the attached floats $C^\times$, $D^\times$ and the valve $E^\times$ are made of such a weight that the lower float $D^\times$ exactly carries the whole weight when the said float is submerged. Thus when the water level in the tank F and in the chamber $A^\times$ falls to the lowest position, the float $D^\times$ is uncovered and the spindle $B^\times$ falls under its own weight. The servomotor cylinder $G^\times$ is thus put into communication with the atmosphere by the pipe $J^\times$ and the air valve H is moved by a spring K and lever $K^1$ to make a connection between the pipes $h^2$ and $h^1$ of Figure 1. When the water level in the tank F and in the chamber $A^\times$ rises to the uppermost position the float $C^\times$ becomes submerged and the spindle $B^\times$ rises, to cause the valve $E^\times$ to place the pipes $J^\times$ and L in communication with each other and with the aforesaid vacuum chamber D. The consequent action of vacuum within the servomotor cylinder $G^\times$ moves the piston $g^\times$ to the right, thus reversing the air valve H and making connection between the pipes $h$ and $h^1$ of Figure 1. A cock M is provided in the pipe $h^1$ and is adjusted to give suitable cycle time. Alternatively this cock may be worked from the float $E^1$ in the vacuum chamber D as indicated in Figure 3 so that the pipe $h^1$ is restricted as the water level in this chamber falls and is entirely closed when a certain minimum position of the liquid in the said chamber is reached.

In some cases the air valve H can be moved by a suitable time mechanism such as that shewn in Figure 4 where a liquid balance comprising a bascule $H^8$ of well known construction is connected by chains to the valve H. Water flowing constantly from a pipe $H^9$ passes into one or the other of two perforated buckets at a greater rate than it can flow out of the bucket and thus causes the bascule to rock about its pivot so as to bring the other bucket into a position to receive water from the pipe $H^9$.

Although I have described water as being the liquid that is raised, it will be understood that any other desired liquid can be raised by the apparatus herein described.

What I claim and desire to secure by Letters Patent of the United States is:—

1. Apparatus for raising a liquid by the head or difference in level between a high level portion of said liquid and a low level portion of said liquid, comprising in combination a chamber arranged above the level of the high level liquid, a conduit extending downwardly from said chamber and communicating at its lower end with the high level liquid so as to constitute a supply conduit, a discharge conduit extending downwardly from said chamber and discharging at its lower end into the low level liquid, said conduits constituting in conjunction with said chamber a siphon serving by the descent of the liquid in the discharge conduit to draw liquid up the supply conduit, an air induction device at the upper end of said discharge conduit serving during the siphoning action to cause air from said chamber to be entrained in the liquid entering said discharge conduit, and means for automatically causing a portion of the liquid to be intermittently discharged from said chamber to the atmosphere at a point substantially above the high level liquid without breaking the continuity of the siphoning action.

2. Apparatus for raising a liquid by the head or difference in level between a high level portion of said liquid and a low level portion of said liquid, comprising in combination a chamber arranged above the level of the high level liquid, a conduit extending downwardly from said chamber and communicating at its lower end with the high level liquid so as to constitute a supply conduit, a discharge conduit extending downwardly from said chamber and discharging at its lower end into the low level liquid, said conduits being arranged co-axially and constituting in conjunction with said chamber a siphon serving by the descent of the liquid in the discharge conduit to draw liquid up the supply conduit, an air induction device at the upper end of said discharge conduit serving during the siphoning action to cause air from said chamber to be entrained in the liquid entering said discharge conduit, and means for automatically causing a portion of the liquid to be intermittently discharged from said chamber to the atmosphere at a point substantially above the high level liquid without breaking the continuity of the siphoning action 3. Apparatus for raising a liquid by the head or difference in level between a high level portion of said liquid and a low level portion of said liquid, comprising in combination a chamber arranged above the level of the high level liquid, a conduit extending downwardly from said chamber and communicating at its lower end with the high level liquid so as to constitute a supply conduit, a discharge conduit extending downwardly from said chamber and discharging at its lower end into the low level liquid, said conduits constituting in conjunction with said chamber a siphon serving by the descent of the liquid in the discharge conduit to draw liquid up the supply conduit, an air induction device at the upper end of said discharge conduit serving during the siphoning action to cause air from said chamber to be entrained in the liquid entering said discharge conduit, means for causing said induction device to float on the liquid within said chamber and means for automatically causing a portion of the liquid to be intermittently discharged from said chamber to the atmosphere at a point substantially above the high level liquid without breaking the continuity of the siphoning action.

4. Apparatus for raising a liquid by the head or difference in level between a high level portion of said liquid and a low level portion of said liquid, comprising in combination a chamber arranged above the level of the high level liquid, a conduit extending downwardly from said chamber and communicating at its lower end with the high level liquid so as to constitute a supply conduit, a discharge conduit extending downwardly from said chamber and discharging at its lower end into the low level liquid, said conduits constituting in conjunction with said chamber a siphon serving by the descent of the liquid in the discharge conduit to draw liquid up the supply conduit, an air induction device at the upper end of said discharge conduit serving during the siphoning action to cause air from said chamber to be entrained in the liquid entering said discharge conduit, means for automatically causing a portion of the liquid to be intermittently discharged from said chamber to the atmosphere at a point substantially above the high level liquid without breaking the continuity of the siphoning action, and means for opening and closing at will ports in the wall between said conduits so as to start the apparatus working without the necessity of creating a vacuum by external means.

5. Apparatus for raising a liquid by the head or difference in level between a high level portion of said liquid and a low lever portion of said liquid, comprising in combination a chamber arranged above the level of the high level liquid, a conduit extending downwardly from said chamber and communicating at its lower end with the high level liquid so as to constitute a supply conduit a discharge conduit extending downwardly from said chamber and discharging at its lower end into the low level liquid, said conduits constituting in conjunction with said chamber a siphon serving by the descent of the liquid in the discharge conduit to draw liquid up the supply conduit, an air induction device at the upper end of said discharge conduit serving during the siphoning action to cause air from said chamber to be entrained in the liquid entering said discharge conduit, a closed tank, a non-return valve arranged between said tank and said chamber so that liquid can pass from said chamber to said tank but not from said tank to said chamber, a tank open to the atmosphere, a non-return valve arranged between the latter tank and said closed tank so that liquid can pass from said closed tank to said open tank, but not from the latter tank to said closed tank, and an intermittently operated air valve arranged in a conduit leading from the upper part of said closed tank to the upper part of said chamber, said valve in one position establishing communication between the air space of said closed tank and the vacuum space of said chamber and at the same time cutting off communication between said closed tank and the atmosphere, and in another position cutting off communication between the air space of said closed tank and the vacuum space of said chamber and at the same time opening the air space of said closed tank to the atmosphere.

6. Apparatus for raising a liquid by the head or difference in level between a high level portion of said liquid and a low level portion of said liquid, comprising in combination a chamber arranged above the level of the high level liquid, a conduit extending downwardly from said chamber and communicating at its lower end with the high level liquid so as to constitute a supply conduit, a discharge conduit extending downwardly from said chamber and discharging at its lower end into the low level liquid, said conduits consisting in conjunction with said chamber a siphon serving by the descent of the liquid in the discharge conduit to draw liquid up the supply conduit, an air induction device at the upper end of said discharge conduit serving during the siphoning action to cause air from said chamber to be entrained in the liquid entering said discharge conduit, means for opening and closing at will ports in the wall between said conduits so as to start the apparatus working without the necessity of creating a vacuum by external means, a closed tank, a non-return valve arranged between said tank and said chamber so that liquid can pass from said chamber to said tank but not from said tank to said chamber, a tank open to the atmosphere, a non-return valve arranged between the latter tank and said closed tank so that liquid can pass from said closed tank to said open tank but not from the latter tank to said closed tank, and an intermittently operated air valve arranged in a conduit leading from the upper part of said closed tank to the upper part of said chamber, said valve in one position establishing communication between the air space of said closed tank and the vacuum space of said chamber and at the same time cutting off communication between said closed tank and the atmosphere, and in another position cutting off communication between the air space of said closed tank and the vacuum space of said chamber and at the same time opening the air space of said closed tank to the atmosphere.

7. Apparatus for raising a liquid by the head or difference in level between a high level portion of said liquid and a low level portion of said liquid, comprising in combination with the elements claimed in claim 5, mechanism for moving the air valve into its different positions in accordance with the rise and fall of the liquid in the closed tank.

8. Apparatus for raising a liquid by the head or difference in level between a high level portion of said liquid and a low level portion of said liquid, comprising in combination with the elements claimed in claim 6, mechanism for moving the air valve into its different positions in accordance with the rise and fall of the liquid in the closed tank.

JENS ORTEN BOVING.